US009807468B2

(12) United States Patent
Yoo et al.

(10) Patent No.: US 9,807,468 B2
(45) Date of Patent: Oct. 31, 2017

(54) BYTE RANGE CACHING

(75) Inventors: Won Suk Yoo, Redmond, WA (US);
Anil K. Ruia, Issaquah, WA (US);
Himanshu Patel, Redmond, WA (US);
Ning Lin, Redmond, WA (US);
Chittaranjan Pattekar, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1041 days.

(21) Appl. No.: 12/485,090

(22) Filed: Jun. 16, 2009

(65) Prior Publication Data
US 2010/0318632 A1 Dec. 16, 2010

(51) Int. Cl.
G06F 15/16 (2006.01)
H04N 21/643 (2011.01)
(Continued)

(52) U.S. Cl.
CPC ..... H04N 21/64322 (2013.01); H04L 65/605 (2013.01); H04L 65/80 (2013.01); H04L 67/2819 (2013.01); H04L 67/2842 (2013.01); H04L 67/2852 (2013.01); H04N 21/23106 (2013.01); H04N 21/6125 (2013.01); *H04L 65/608* (2013.01)

(58) Field of Classification Search
CPC . H04L 67/2842; H04L 67/02; H04L 67/2852; H04L 67/108; G06F 12/0866; G06F 12/0802; G06F 17/3002; G06F 17/30902; G06F 2212/601
USPC ........ 709/200–227; 711/6, 1, 28, 26, 27, 56, 711/35, 37, 44, 10
See application file for complete search history.

(56) References Cited

U.S. PATENT DOCUMENTS 5,909,540 A * 6/1999 Carter et al. ................... 714/4.4
5,950,199 A * 9/1999 Schmuck et al.
(Continued)

FOREIGN PATENT DOCUMENTS

EP 0930572 A2 * 7/1999 ......... G06F 9/45504

OTHER PUBLICATIONS

U.S. Appl. No. 61/095,751 by Peter Lepeska, "Methods and Systems for implementing a dedicated shared byte cache", filed Sep. 10, 2008 (i.e., see Publication US 2010/0070570 A1).*

(Continued)

Primary Examiner — Oleg Survillo
(74) Attorney, Agent, or Firm — Fiala & Weaver P.L.L.C.

(57) ABSTRACT

A caching system segments content into multiple, individually cacheable chunks cached by a cache server that caches partial content and serves byte range requests with low latency and fewer duplicate requests to an origin server. The system receives a request from a client for a byte range of a content resource. The system determines the chunks overlapped by the specified byte range and sends a byte range request to the origin server for the overlapped chunks not already stored in a cache. The system stores the bytes of received responses as chunks in the cache and responds to the received request using the chunks stored in the cache. The system serves subsequent requests that overlap with previously requested ranges of bytes from the already retrieved chunks in the cache and makes requests to the origin server only for those chunks that a client has not previously requested.

20 Claims, 5 Drawing Sheets

(51) Int. Cl.
*H04L 29/06* (2006.01)
*H04N 21/231* (2011.01)
*H04N 21/61* (2011.01)
*H04L 29/08* (2006.01)

(56) References Cited

U.S. PATENT DOCUMENTS

| | | | |
|---|---|---|---|
| 5,956,712 A * | 9/1999 | Bennett et al. | |
| 6,018,789 A * | 1/2000 | Sokolov et al. | 711/113 |
| 6,035,432 A * | 3/2000 | Jeddeloh | G11C 29/765 |
| | | | 714/710 |
| 6,141,728 A * | 10/2000 | Simionescu et al. | 711/113 |
| 6,151,660 A * | 11/2000 | Aoki | 711/129 |
| 7,013,322 B2 | 3/2006 | Lahr | |
| 7,441,012 B2 | 10/2008 | Palevich et al. | |
| 7,970,820 B1 | 6/2011 | Sivasubramanian et al. | 709/203 |
| 8,271,734 B1 * | 9/2012 | Glasco | G06F 12/084 |
| | | | 345/546 |
| 2002/0069338 A1 * | 6/2002 | Ozdemir et al. | 711/171 |
| 2003/0204602 A1 * | 10/2003 | Hudson et al. | 709/228 |
| 2004/0078491 A1 * | 4/2004 | Gormish et al. | 709/247 |
| 2006/0031537 A1 * | 2/2006 | Boutboul et al. | 709/228 |
| 2006/0041637 A1 | 2/2006 | Jerrard-Dunne | |
| 2007/0136481 A1 * | 6/2007 | Dierks, Jr. | H04L 69/24 |
| | | | 709/228 |
| 2007/0204003 A1 * | 8/2007 | Abramson | 709/217 |
| 2007/0226417 A1 * | 9/2007 | Davis | 711/118 |
| 2008/0037527 A1 * | 2/2008 | Chan et al. | 370/353 |
| 2008/0168133 A1 * | 7/2008 | Osborne | 709/203 |
| 2009/0106356 A1 * | 4/2009 | Brase et al. | 709/203 |
| 2009/0182946 A1 * | 7/2009 | Zhou | G06F 17/30902 |
| | | | 711/129 |
| 2010/0070570 A1 * | 3/2010 | Lepeska | 709/203 |
| 2010/0080290 A1 * | 4/2010 | Mehrotra | 375/240.07 |
| 2010/0191805 A1 * | 7/2010 | Lu et al. | 709/203 |

OTHER PUBLICATIONS

"Application Request Routing", Retrieved at <<http://www.iis.net/extensions/ApplicationRequestRouting>>, May 1, 2009, pp. 2.

"Header Field Definitions", Retrieved at <<http://www.w3.org/Protocols/rfc2616/rfc2616-sec14.html>>, May 1, 2009, pp. 1-39.

Fielding, et al., Range Requests and Partial Responses, Retrieved at <<http://labs.apache.org/webarch/http/draft-fielding-http-p5-range.html#byte.ranges>>, Nov. 2007, pp. 1-9.

Park, et al., "Deploying Large File Transfer on an HTTP Content Distribution Network", Retrieved at <<http://nsg.cs.princeton.edu/publication/codeploy_worlds_04.pdf>>, In First Workshop on Real, Large Distributed Systems, 2004, pp. 6.

* cited by examiner

BYTE RANGE CACHING

BACKGROUND

Streaming media is multimedia that is constantly received by, and normally presented to, an end-user (using a client) while it is being delivered by a streaming provider (using a server). Several protocols exist for streaming media, including the Real-time Streaming Protocol (RTSP), Real-time Transport Protocol (RTP), and the Real-time Transport Control Protocol (RTCP), which are often used together. The Real Time Streaming Protocol (RTSP), developed by the Internet Engineering Task Force (IETF) and created in 1998 as Request For Comments (RFC) 2326, is a protocol for use in streaming media systems, which allows a client to remotely control a streaming media server, issuing VCR-like commands such as "play" and "pause," and allowing time-based access to files on a server.

The Internet contains many types of downloadable media content items, including audio, video, documents, and so forth. These content items are often very large, such as video in the hundreds of megabytes. Documents are often retrieved over the Internet using the Hypertext Transport Protocol (HTTP) through a web browser or other application. The Internet has built up a large infrastructure of routers and proxies that are effective at caching data for HTTP. Cached data can be provided to clients with less delay and by using fewer resources than re-requesting the content from the original source. For example, a user in New York may download a content item served from a host in Japan and receive the content item through a router in California. If a user in New Jersey requests the same file, the router in California may be able to provide the content item without again requesting the data from the host in Japan. This reduces the network traffic over possibly strained routes, and allows the user in New Jersey to receive the content item with less latency.

Often, a user is only interested in a portion of a large content item, such as a particular page of a large PDF or a particular time range in a large video. Unfortunately, the only way to get the desired portion of the content item in some cases is to download the entire content item to the user's computer and then open the content item to find the portion of interest. Even if a user could retrieve a portion of a large content item, it is desirable for the portion to be cacheable by the existing Internet infrastructure, and to be compatible with later downloading of additional portions of the same content item.

One prior attempt to solve this problem is HTTP byte ranges or byte serving. Byte serving is the process of sending only a portion of an HTTP/1.1 message from a server to a client. In the HTTP/1.0 standard, clients were only able to request an entire document. By allowing byte serving, HTTP/1.1 allows clients to choose any portion of the resource by specifying the bytes of the resource to download. One use of this capability is that when a large file is being requested, and that media file is properly formatted, the client may be able to request just the portions of the file known to be of interest. Even where files are not specially formatted, clients can retrieve portions of the files using byte range requests. For example, a client could send a byte range request to get a portion of an image file (e.g., a JPG or GIF). Most mainstream web servers support byte range requests, so any type of content served by most websites can be retrieved using byte ranges.

Unfortunately, it is difficult to cache HTTP resources requested by byte range. When a cache receives a request for a byte range of a resource that is not already in the cache, past systems handle the request using one of two strategies. The first strategy is to start retrieving the content resource from the beginning and reply to the request when enough of the content is in the cache to satisfy the request. The cache can then continue to retrieve the full content resource after replying to the request. This strategy introduces an amount of extra latency relative to the offset of the byte range from the beginning of the content resource that may be unacceptable for many applications. This strategy may also include an offset threshold, where requests for offsets outside the threshold are not retrieved from the beginning. Instead, such requests may just be proxied to the content server to keep the extra latency of downloading the unrequested range of content at an acceptable level. This can lead to fewer cache hits as many requests may fall outside of the offset threshold. The second strategy is for a cache to send a second request for a full content resource after an initial cache miss related to a byte range request. This adds an extra request and burden to the origin server and increases the overall amount of data retrieved. For both of these strategies, a cache hit cannot occur unless the full content resource is stored in the cache.

SUMMARY

A caching system is described herein that segments content into multiple pieces (chunks) that are individually cached by a cache server. This allows the cache server to cache partial content and to be able to serve byte range requests with low latency and fewer duplicate requests to the origin server. The caching system receives a request from a client that specifies a byte range of a content resource. The system remaps the original byte range request into a byte range request based on a configurable chunk size of the cache server. The system sends the remapped chunk-based request to the origin server. Upon receiving a response to the chunk request, the system caches the response as chunks in the cache. Upon receiving subsequent requests that overlap with a previously requested range of bytes, the system can serve the already retrieved chunks from the cache and make a request to the origin server only for those chunks that a client has not previously requested. Thus, the caching system allows a cache hit for a byte range request from a client even when the full content resource specified by the request is not stored in the cache and does not burden the origin server with duplicate requests for bytes already previously requested. In addition, clients can still request whole content resources using a normal, non-byte range request. The system can serve these requests from the cache if all chunks are available and can request any missing chunks from the origin server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
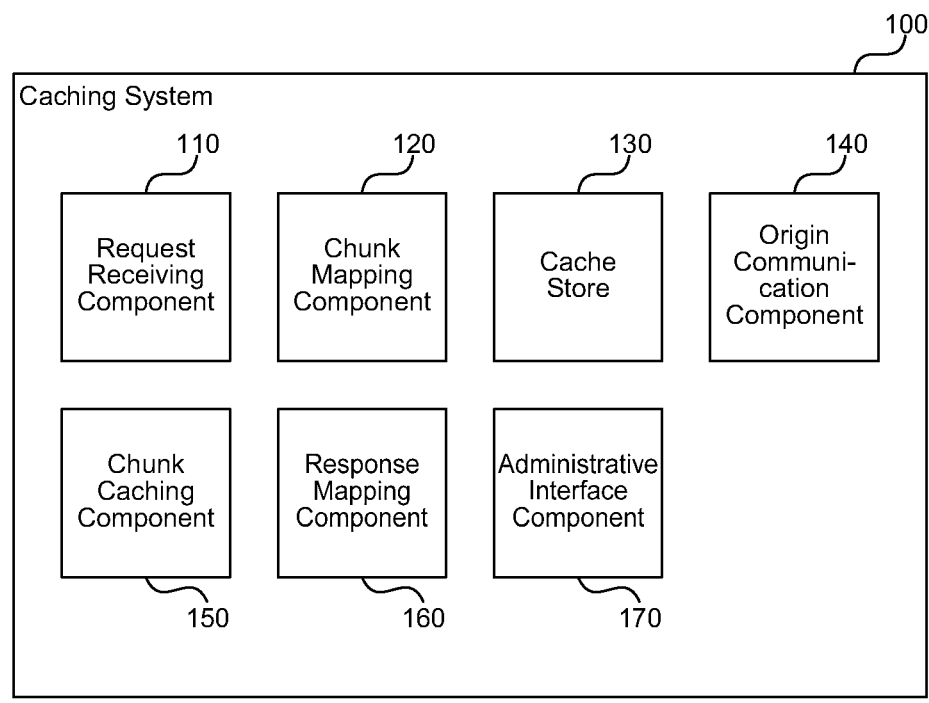
FIG. 1 is a block diagram that illustrates components of the caching system, in one embodiment.

A caching system is described herein that segments content into multiple pieces (chunks) that are individually cached by a cache server. This allows the cache server to cache partial content and to be able to serve byte range requests with low latency and fewer duplicate requests to the origin server. The caching system receives a request from a client that specifies a byte range of a content resource. For example, an origin server may contain a 1,000,000-byte file, and the request may specify 1,000 bytes in the middle (e.g., offset 500,050, length 1,000). The system remaps the original byte range request into a byte range request based on a configurable chunk size of the cache server. For example, if the chunk size is 100 bytes, then the system will remap the previous request for 1,000 bytes into a byte range request for bytes 500,000 to 501,100 to align the request with the chunk size. Even when a client requested byte range does not overlap with the chunk size (e.g., a request for bytes 580 to 780 rather than 500 to 700), the system can select a chunk-aligned byte range that covers the requested bytes.

The system sends the remapped chunk-based request to the origin server. Upon receiving a response to the chunk request, the system caches the response as chunks in the cache. For example, the system may store the response as 100-byte chunk files on the cache server. Upon receiving subsequent requests that overlap with a previously requested range of bytes, the system can serve the already retrieved chunks from the cache and make a request to the origin server only for those chunks that a client has not previously requested. Thus, the caching system allows a cache hit for a byte range request from a client even when the full content resource specified by the request is not stored in the cache. In addition, the caching system does not burden the origin server with duplicate requests for bytes already previously requested.

For the same content resource, the caching system may receive either a non-byte range request or a byte-range request and the system will handle the request accordingly. For example, if the first request for a content resource is a non-byte range request, then the system will pull down the full content resource and cache the full content resource locally. If the second request for the content resource is a byte-range request, rather than trying to figure out the chunk pieces or remapping the ranges, the system can detect that it has the full content cached, so it will serve the corresponding byte-range response without having to make any additional requests to the content server (i.e., there are no missing pieces if you already have the full content). On the other hand, if all requests are byte-range requests, then the cache proxy will only send requests to the content server for any missing pieces.

FIG. 1 is a block diagram that illustrates components of the caching system, in one embodiment. The system 100 includes a request receiving component 110, a chunk mapping component 120, a cache store 130, an origin communication component 140, a chunk caching component 150, a response mapping component 160, and an administrative interface component 170. Each of these components is described in further detail herein.

The request receiving component 110 receives requests from clients to download a portion of a content resource. For example, the component 110 may receive an HTTP byte range request that specifies a portion of a file stored on a web server. The request receiving component 110 may operate on a cache server that sits between clients that send requests and origin servers that serve content. A network, such as the Internet, may have many such cache servers at various levels. For example, the cache servers may include routers and proxies close to the client and the origin server and various locations in between (e.g., major transitions between continents or providers, and so forth). The request receiving component 110 passes the request to the chunk mapping component 120 for mapping into chunks stored by the caching system 100.

The chunk mapping component 120 maps received client requests into resource chunks stored by a cache server. For example, the cache server may store each content resource in 100-byte chunks, and based on the starting and ending offset of the request, the client request will overlap with some or all of the chunks. The chunk mapping component 120 may create a data structure for each request that stores the original requested range, the chunks that are available in the cache, and the chunks not in the cache that will be requested from the origin server. As responses from the origin server come in, the system 100 can use the data structure to gradually fill in each of the chunks to satisfy the request. When all chunks related to the request are stored in the cache, the system can use the information about the original request to compose a response to the actual byte range originally requested.

The cache store 130 is a data store that stores cache chunks received from an origin server in response to one or more chunk requests. The data store may also store traditional full content resources cached in response to normal, non-byte range requests. The data store can leverage cached full content resources for serving byte range requests by extracting the requested bytes. The data store may include a database, file system, storage area network (SAN), cloud-based storage area, or other storage unit for storing and accessing cached content resource chunks. The cache store 130 may use a naming scheme or metadata fields to describe the content resource to which each stored chunk is related. For example, when using a file system, the cache store 130 may name chunks of a content resource "foo.wmv" according to the portion of the resource that each chunk represents (e.g., "foo_100.wmv" for the first 100 bytes, "foo_200.wmv" for the second 100 bytes, and so forth). Those of ordinary skill in the art will recognize many conventions for naming and storing portions of content to allow fast subsequent identification and retrieval of one or more appropriate portions.

The origin communication component 140 sends chunk-aligned byte range requests to the origin server for chunks requested by clients that are not stored in the cache store 130. The origin communication component 140 may use the same protocol as client requests or a different protocol. For example, the component 140 may map client HTTP byte range requests for any range into HTTP byte range requests for ranges in increments of a configurable chunk size. For client requests that match the configured chunk size and boundary, the origin communication component 140 may simply forward the request to the origin server and cache the response. The chunk size sets a cap on the overhead that a client request may incur beyond the byte range requested by the client. For example, for a chunk size of 100, the client will incur at most the latency period that it takes to download 99 bytes on each of the beginning and end of a request in additional overhead. If the client requests bytes 99 to 101, for example, a request of three bytes will result in the origin communication component 140 sending a single byte range request that specifies bytes 0-199 to the origin server to fill in the missing chunks (bytes 0-99 and 100-199) to satisfy the client request. Thus, the origin communication component 140 may remap the client's byte range request for bytes 99-101 to a byte range request to the origin server for bytes 0-199. An administrator can set the chunk size to a value that provides an acceptable level of potential extra latency in view of the substantial benefit of more frequent cache hits and reduced origin server burden. The administrator may also set the value based on the typical range of requests that is common for the administrator's network. Matching this range size to the chunk size can further help network bandwidth and latency.

The chunk caching component 150 stores chunk request responses from the origin server in the cache store 130. As noted previously, the component 150 may store chunk data in a way (e.g., a naming convention or metadata) that associates the chunk data with the content resource of which it is a part and the specific byte range of the content resource that the chunk represents. The chunk caching component 150 may operate in parallel with other components of the system 100 so that, for example, the system 100 can provide a reply to the client before or while the chunk response is stored. The chunk caching component 150 may also handle overlapping requests for the same content or periodic expiration of content chunks, so that newer data from the origin server for a chunk overwrites older cached data.

The response mapping component 160 maps the chunks available in the cache store 130 to the byte range specified by a received client request. For example, if a client requests bytes 99 to 101 from a cache server with a 100 byte chunk size, then the component 160 handles retrieving byte 99 from the first chunk and bytes 100-101 from the second chunk to form a single response to the client with the requested three bytes. Accordingly, the caching system 100 is still effective even when clients do not make requests aligned to the chunk size of the cache server, though misalignment may introduce negligible additional latency for the client as bytes not requested by the client are retrieved and cached. Nevertheless, this overhead is substantially less than prior systems that could not provide a cache hit without downloading the entire content resource first. In addition, the administrator can control the overhead by modifying the chunk size.

The administrative interface component 170 provides an interface through which an administrator can monitor and configure the caching system 100. For example, the component 170 may provide a graphical user interface (GUI), console user interface (CUI), programmatic interface (e.g., for scripting), or other interface. An administrator may perform actions such as checking and updating the chunk size, viewing statistics about past cache hits and misses, monitor current requests, and so forth. The administrative interface component 170 allows the administrator to stay abreast of any problems with the system 100 and to update the configuration to alleviate the problems.

In some embodiments, the caching system is implemented as an extension of an existing web server. For example, Microsoft Internet Information Server (IIS), Apache, and other web servers provide facilities for receiving and responding to HTTP traffic within custom-built extension modules. The caching system can be embodied within an extension module to receive and response to HTTP traffic received from clients as well as to communicate with an origin server. Using an existing web server relieves the system designer from building a stand-alone application for caching, though those of ordinary skill in the art will recognize that such embodiments are also achievable with the system described herein.

The computing device on which the caching system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
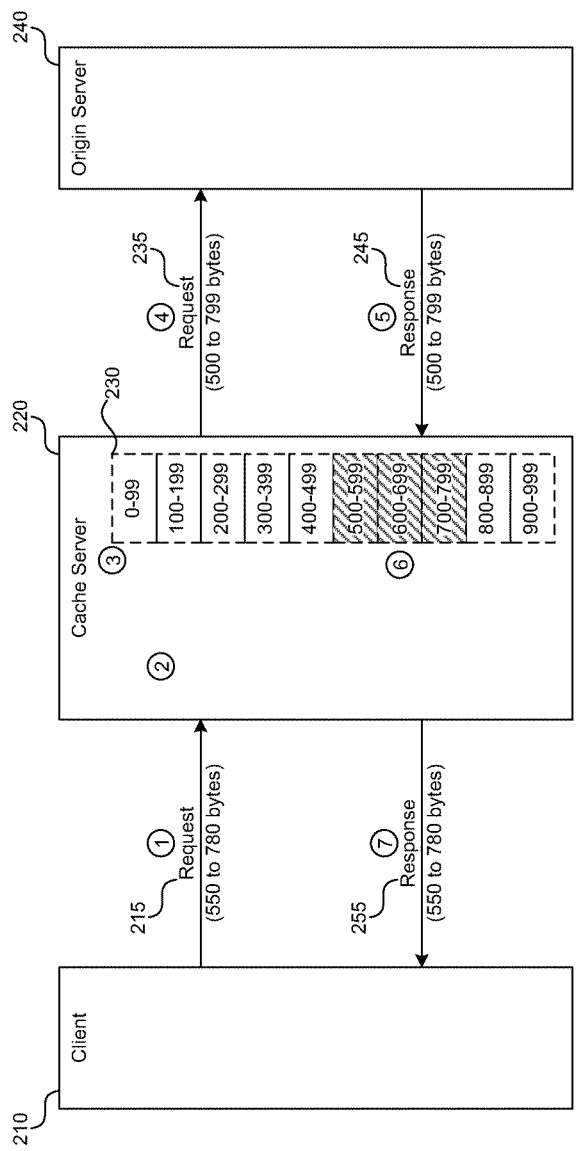
FIG. 2 is a block diagram that illustrates the flow of data and requests from a client to the caching system, in one embodiment.

FIG. 2 is a block diagram that illustrates the flow of data and requests from a client to the caching system, in one embodiment. A client 210 sends a byte range request 215 for bytes between 550 and 780, inclusive. The cache server 220 receives the request and checks a chunk cache 230 for the requested bytes of the requested resource. Upon discovering that the requested bytes are not stored in the chunk cache 230, the cache server 220 indicates a cache miss. Given that each chunk is 100 bytes in size in this example, the cache server 220 can easily determine that the requested byte range, 550 to 780, will span across three chunks: 500-599, 600-699, and 700-799. The cache server 220 rewrites the original byte range request to create a request 235 to an origin server 240 that will fetch the contents for bytes 500 to 799, inclusive. The origin server 240 receives the request 235 and provides a response 245 that includes the requested bytes of the requested content resource.

Upon receiving the response 245, the cache server 220 breaks the response into cacheable chunks and saves the bytes of the response 245 associated with each chunk as three separate cached objects in the chunk cache 230 (e.g., as files in disk based cache). Then, the cache server 220 rewrites the response 245 to match the original request 215 and produce a new response 255 to the client that includes the requested byte range, bytes 550 and 780 inclusive. In this example, subsequent byte-range requests that "fit" in ranges between 500 and 799 will result in a cache hit. Through the randomness of subsequent byte-range requests, other chunks are eventually cached over time until the chunk cache 230 contains all chunks of a content resource.

Figure 3:
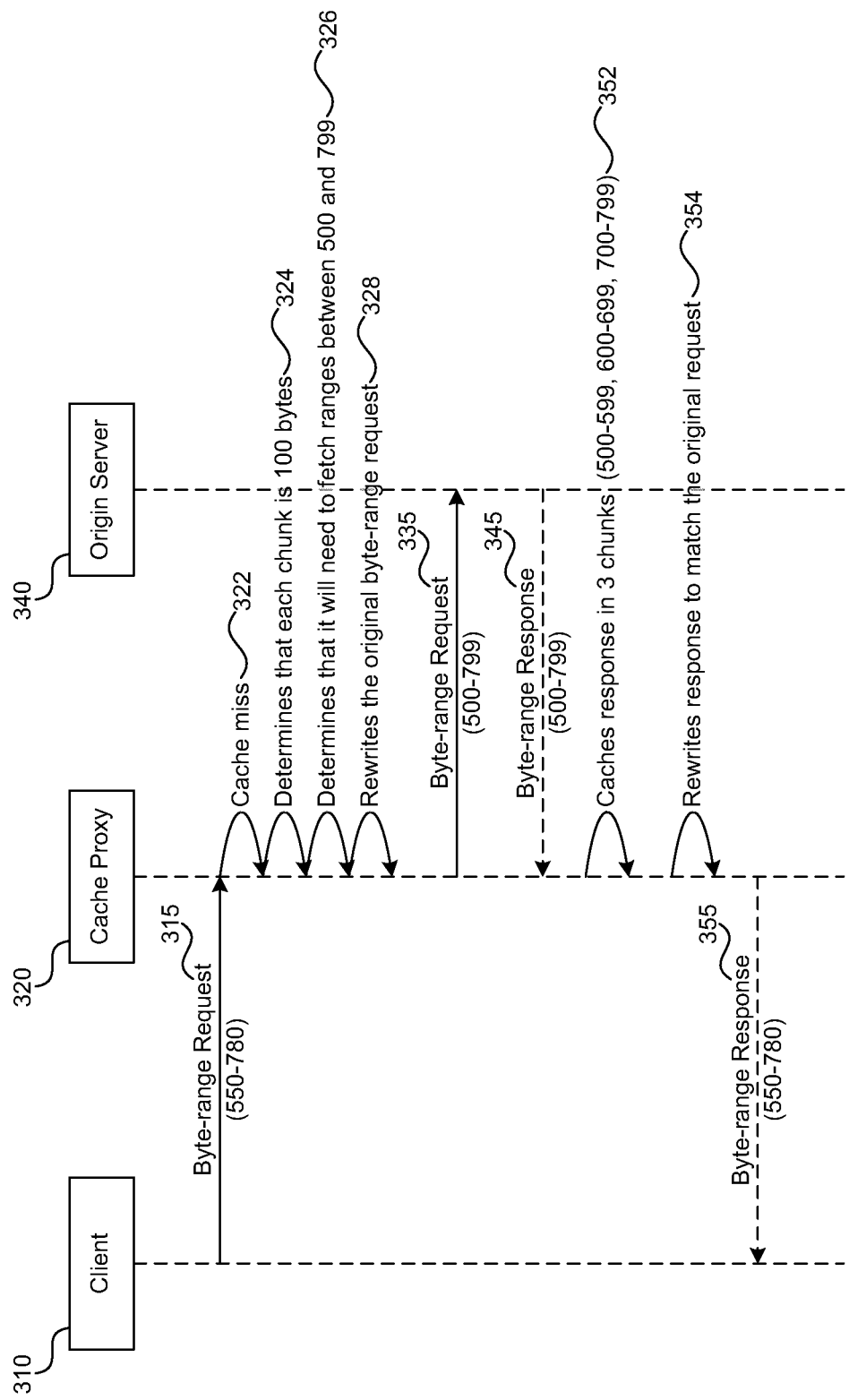
FIG. 3 is a sequence diagram that further illustrates the example of FIG. 2, in one embodiment.

FIG. 3 is a sequence diagram that further illustrates the example of FIG. 2, in one embodiment. A client 310 sends a byte range request 315 for bytes between 550 and 780, inclusive. The cache server 320 receives the request and checks a chunk cache for the requested bytes of the requested resource. Upon discovering that the requested bytes are not stored in the chunk cache, the cache server 320 indicates a cache miss 322. The cache server 320 determines 324 that each chunk is 100 bytes in size and determines 326 that the requested byte range, 550 to 780, will span across three chunks: 500-599, 600-699, and 700-799. The cache server 320 rewrites 328 the original byte range request to create a request 335 to an origin server 340 that will fetch the contents for bytes 500 to 799, inclusive. The origin server 340 receives the request 335 and provides a response 345 that includes the requested bytes of the requested content resource. Upon receiving the response 345, the cache server 320 caches 352 the response as three separate cached objects in the chunk cache. Then, the cache server 320 rewrites 354 the response 345 to match the original request 315 and produce a new response 355 to the client that includes the requested byte range, bytes 550 and 780 inclusive.

Figure 4:
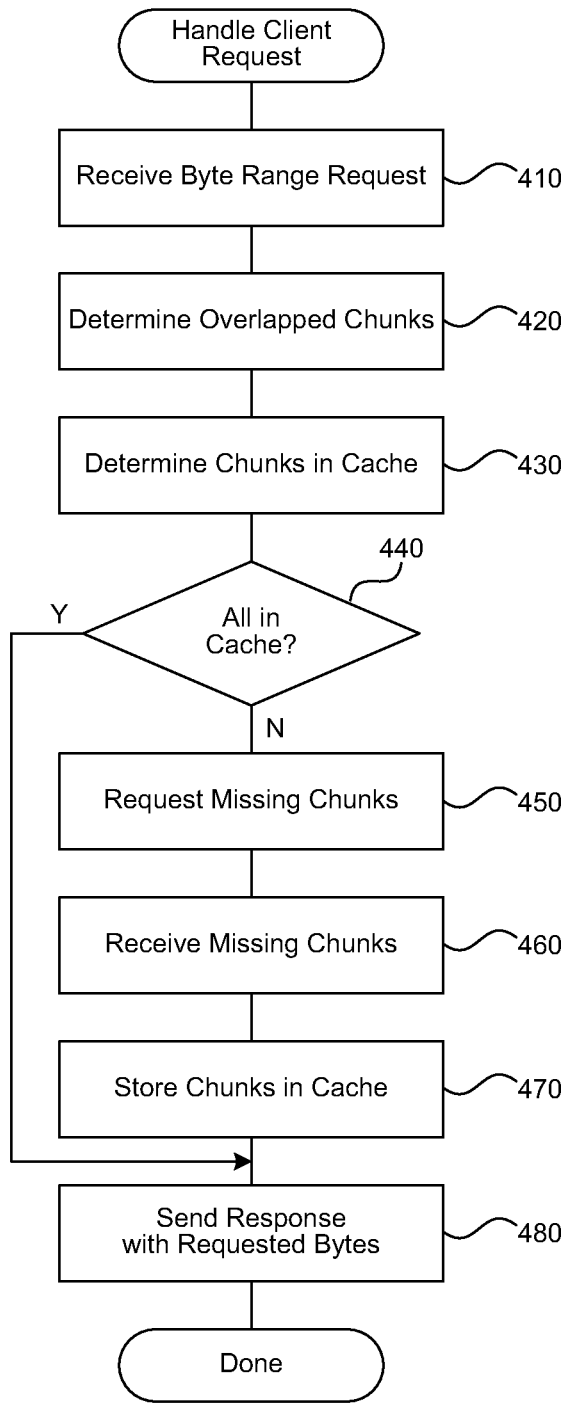
FIG. 4 is a flow diagram that illustrates the processing of the caching system to handle a client request for a range of bytes, in one embodiment.

FIG. 4 is a flow diagram that illustrates the processing of the caching system to handle a client request for a range of bytes, in one embodiment. Beginning in block 410, the caching system receives a request for a range of bytes that represents a portion of a content resource stored on a server. For example, a client may request the header bytes of a video or a particular set of frames at a known offset within a video file. Continuing in block 420, the caching system identifies one or more chunks that the requested range of bytes overlaps based on a configurable chunk size into which the caching system divides the content resource. The caching system may divide files into 1,000-byte chunks and cache each chunk independently. The last chunk of each file may be smaller than the chunk size based on the total size of the file. The caching system identifies overlapped chunks by inspecting the starting offset and size of the byte range request to determine the chunks into which the beginning and end of the byte range fall. The overlapped chunks are the determined beginning and ending chunk and each chunk in between.

Continuing in block 430, the caching system determines whether each overlapped chunk is currently stored in a cache. For example, the system may use a lookup table or other data structure that indexes the chunks to determine whether each overlapped chunk is available in the cache. Continuing in decision block 440, if the caching system determines that all overlapped chunks are currently stored in the cache, then a cache hit has occurred and the system jumps to block 480, else a cache miss has occurred and the system continues at block 450 to retrieve any missing chunks. Note that the system can experience a partial hit as to some chunks and only retrieve those chunks that are missing. For example, a byte range request for bytes 500-799, where chunks 500-599 and 600-699 are already stored in the cache, will result in a request to the origin server for only the missing chunk 700-799. Continuing in block 450, the system sends a byte range request to an origin server to download the overlapped chunks that are not stored in the cache. The system may rewrite the buffer of the original request to expand the range to chunk sized boundaries, or may create a new request. The request to the origin server appears to the origin server just like a client request but specifies a range of bytes sufficient for the response to fill whole chunks in the cache of the caching system.

Continuing in block 460, the caching system receives a response from the origin server that contains the requested overlapped chunks. For example, the response may include an HTTP 200 OK message or an HTTP 206 partial content message along with data bytes specifying the requested byte range. Continuing in block 470, the caching system stores the received byte range in corresponding chunks in the cache. For example, if the byte range request was for bytes 500-799 and the chunk size is 100, then the system stores the bytes as chunks with bytes 500-599, 600-699, and 700-799. The system stores the chunks in the cache and may update any index of chunks available in the cache. Continuing in block 480, the caching system sends a response to the received request that includes the specified range of bytes retrieved from the cache. Subsequent requests for the same range of bytes or for ranges of bytes that overlap the requested range of bytes can be served from the cache. Subsequent requests may also include some bytes that are stored in the cache and some bytes that are not yet cached for which the system sends additional requests to the origin server. After block 480, these steps conclude.

Figure 5:
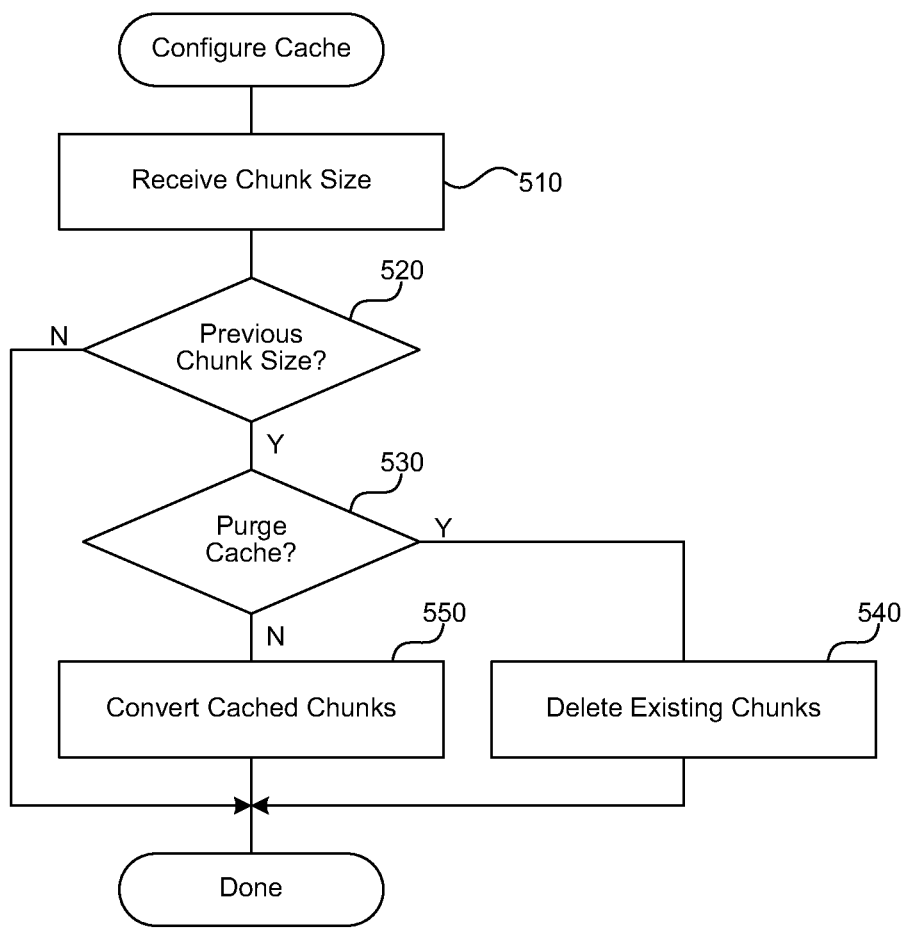
FIG. 5 is a flow diagram that illustrates the processing of the administrative interface to handle a request to set or modify the chunk size, in one embodiment.

FIG. 5 is a flow diagram that illustrates the processing of the administrative interface to handle a request to set or modify the chunk size, in one embodiment. Administrators may rarely set the chunk size to a new value, but may occasionally monitor past cache behavior to determine that a different size would provide a better client experience or less burden on an origin server. Beginning in block 510, the administrative interface receives a request to set the chunk size. For example, an administrator may determine that a larger chunk size would increase cache hits and reduce origin server overhead. As a result, the administrator may set the size from 100 bytes to 1,000 bytes.

Continuing in decision block 520, if a chunk size was previously set, then the interface continues in block 530, else if this is an initial chunk size, the interface stores the chunk size and completes. Continuing in decision block 530, the interface determines whether the administrator wants to purge an existing cache of chunks. If the administrator wants to purge the existing cache, then the system continues at block 540, else the system continues at block 550. For example, the administrative interface may receive a Boolean option with the received request that indicates whether the administrator wants to purge the existing cache. The existing cache may have built up a large amount of data such that purging the data would unnecessarily result in cache misses and requests to an origin server.

Continuing in block 540, the interface deletes the existing cache of chunks. For example, the interface may delete one or more files associated with the chunks in the cache. Because there is no cached data after the deletion, there is no further processing for changing the chunk size related to converting any existing chunks, so the interface completes. Continuing in block 550, the interface converts the existing cache of chunks to chunks of the requested chunk size. When the new chunk size is a multiple of the old chunk size, the conversion is straightforward, particularly where the new size is smaller than the old size. In that case, the interface splits the existing cache chunks into the smaller cache chunks. In cases where the change in chunk size results in partial chunks, the system may discard the partial chunks, request the missing parts of the partial chunks, or pursue a hybrid strategy of keeping the available bytes and requesting the missing bytes upon receiving a request. To that end, the system may maintain a byte-based index or index of a size as small as a lower boundary on the chunk size to enable easy switching between chunk sizes. After block 550, these steps conclude.

Note that although FIG. 5 illustrates steps that the caching system may perform when an administrator requests a chunk size change, the system may also be implemented to do nothing when the chunk size is changed. It is common in cache servers to attempt to reduce the work performed by the server to improve performance for clients of the cache server. Thus, it is possible that when the chunk size is changed the system may simply leave the chunks for the previous size on disk or other storage, and neither convert them nor delete them. Cache items already expire according to a routine schedule (or are removed according to a least requested algorithm), so the out of date chunks will be removed eventually by this process without taking explicit steps to remove them in response to a change in chunk size.

In some embodiments, the caching system requests additional bytes when requesting a portion of a content resource from an origin server. For example, the system may determine a pattern of access to the content resource, such as gradual sequential access of the content resource, and anticipate subsequent requests by requesting additional bytes from the origin server. The caching system may respond to the original request as soon as enough bytes have been received from the origin server to satisfy the request, while continuing to store additional bytes received after the request is complete. Alternatively or additionally, the caching system may request additional bytes of partially cached content resources when the cache server is idle or at other good opportunities to send additional requests to the origin server. These strategies may allow the cache server to have a cache hit for ranges of bytes that would otherwise have resulted in a cache miss with the attendant additional latency of a round trip to the origin server.

In some embodiments, the caching system cooperates with other caching strategies. For example, the system may receive requests for an entire content resource after particular chunks of the resource have already been retrieved. In such cases, the system may attempt to fill the cache by requesting the missing chunks from the origin server so that the entire content resource can be served from the cache. As another example, the system may use an offset threshold in cooperation with the strategies described herein to determine a point at which the system retrieves the entire content resource instead of just portions of the resource. These and other strategies can work in concert with the strategies described herein to provide the desired cache behavior for a variety of situations.

In some embodiments, the caching system handles range requests for protocols that allow multiple ranges. In other words, the bytes specified by a request are not necessarily contiguous, and some protocols allow multiple ranges, such as a list of ranges (e.g., 0-200, 400-450). The caching system handles such requests in much the same way already described. The system determines the chunks overlapped by the request, determines whether the overlapped chunks are in the cache, and sends one or more requests to the origin server for chunks not in the cache. When the origin server responds, the caching system fills in the missing cache chunks and responds to the request according to the specified ranges.

In some embodiments, the caching system handles ranges in units other than bytes. Depending on the protocol used with the system, the system may support other ranges types, such as pages of a document, minutes of a video, and so forth that are appropriate for various domains of resources. The caching system can create chunks that map to each of these types of ranges and satisfy client range requests based on the chunks stored in the cache.

From the foregoing, it will be appreciated that specific embodiments of the caching system have been described herein for purposes of illustration, but that various modifications may be made without deviating from the spirit and scope of the invention. For example, although HTTP has been used in, the caching system can be used with other protocols that have similar byte-based or other increment-based request models. Accordingly, the invention is not limited except as by the appended claims.

We claim:

1. A computer-implemented method for responding to client requests at a cache server for portions of a content resource, the method comprising:
   receiving at a cache server a first request for a first range of bytes that represents a portion of a content resource stored on an origin server;
   identifying one or more chunks that the requested first range of bytes overlaps based on a chunk size into which the cache server divides the content resource, the chunk size being configurable based on the cache server receiving a request to modify the chunk size;
   determining whether each overlapped chunk is currently stored in a cache of the cache server;
   upon determining that at least one overlapped chunk is not currently stored in the cache of the cache server,
   generating, by the cache server, a second request that remaps the first range of bytes to a second range of bytes that is aligned with the configurable chunk size, the second range of bytes being different than the first range of bytes;
   sending the second request to the origin server to download the overlapped chunks that are not stored in the cache;
   receiving a response from the origin server that contains a byte range that includes the requested overlapped chunks;
   storing the received byte range in corresponding chunks in the cache; and
   sending a response to the received first request that includes the specified range of bytes retrieved from the cache,
   the preceding steps being performed by at least one processor.

2. The method of claim 1 wherein identifying one or more chunks comprises inspecting a starting offset and a size of the first request to determine the chunks into which the beginning and end of the byte range fall.

3. The method of claim 1 wherein determining whether each overlapped chunk is currently stored in the cache comprises using a data structure that indexes the chunks to determine whether each overlapped chunk is available in the cache.

4. The method of claim 1 wherein generating the second request comprises rewriting a buffer of the first request to expand the range to be aligned with the configurable chunk size.

5. The method of claim 1 wherein the second range of bytes comprises bytes in chunks in addition to those overlapped by the received request.

6. The method of claim 1 wherein the second request appears to the origin server like a client request but specifies a range of bytes sufficient for the response to fill whole chunks in the cache.

7. The method of claim 1 wherein storing the received byte range in corresponding chunks in the cache comprises updating an index of chunks available in the cache.

8. The method of claim 1 wherein subsequent requests for the same range of bytes or for ranges of bytes that overlap the requested range of bytes can be served from the cache.

9. The method of claim 1 further comprising, in response to determining that a request includes some bytes that are stored in the cache and some bytes that are not yet cached, sending an additional request to the origin server to download the bytes that are not yet cached.

10. The method of claim 1 wherein the received first request includes multiple non-contiguous ranges of bytes and the response provides the specified multiple ranges of bytes.

11. A computer system for caching chunks of a content resource at a cache server to respond to client requests for portions of the resource, the system comprising:
a processor; and
a memory that stores instructions, which, when executed by the processor, cause the processor to perform a method, the method comprising:
receiving first requests from clients to download a portion of the content resource from the cache server, each of the first requests specifying a first byte range that represents the portion of the content resource;
storing cache chunks received from an origin server in a cache store at the cache server in response to a chunk request, the chunk size being determined by the cache server;
generating, by the cache server, second requests that remap the first byte ranges specified by the first requests to second byte ranges that are aligned with the chunk size, the second byte ranges being different than the first byte ranges;
sending the second requests from the cache server to the origin server for chunks requested by clients that are not stored in the cache store;
storing chunk request responses from the origin server in the cache store of the cache server; and
mapping the chunks available in the cache store to the first byte ranges specified by the first requests.

12. The system of claim 11 wherein the method further comprises receiving Hypertext Transfer Protocol (HTTP) byte range requests that specify a portion of a file stored on a web server.

13. The system of claim 11 wherein the cache server sits between clients that send requests and origin servers that serve content.

14. The system of claim 11 wherein the method further comprises creating a data structure for each first request that stores an original requested range, zero or more chunks that overlap the requested range that are available in the cache, and one or more chunks not in the cache that will be requested from the origin server.

15. The system of claim 11 wherein the method further comprises using a naming scheme or metadata fields to describe a content resource to which each stored chunk is related.

16. The system of claim 11 wherein the second byte ranges overlap the first byte ranges.

17. The system of claim 11 wherein the method further comprises operating in parallel with other components of the system so that the system can provide a reply to a client before or while storing the chunk response from the origin server.

18. The system of claim 11 wherein the method further comprises providing an interface through which an administrator can monitor and configure the system.

19. The system of claim 11 wherein the cache server is implemented as an extension of an existing web server within one or more custom built extension modules.

20. A computer-readable storage device comprising instructions for controlling a computer system to configure a cache at a cache server that caches chunks of a content resource originally provided by an origin server, the instructions, when executed, causing a processor to perform actions comprising:
receiving a request at the cache server to set a chunk size that specifies an upper boundary on the size of a chunk of the content resource that will be cached by the cache server, the request being generated based on user input submitted via a user interface;
determining a previously set chunk size;
determining whether the request specifies purging existing chunks of the content resource in the cache;
upon determining that the request specifies purging existing chunks of the content resource in the cache, deleting the existing chunks of the content resource from the cache;
upon determining that the request does not specify deleting existing chunks of the content resource from the cache, changing a size of the existing chunks of the content resource in the cache to the requested chunk size;
receiving a first byte range request specifying a first range of bytes representing a portion of the content resource; and
generating a second byte range request that remaps the first range of bytes to a second range of bytes that is aligned with the requested chunk size, the second range of bytes being different than the first range of bytes.

* * * * *